United States Patent
Lin et al.

(10) Patent No.: US 9,870,087 B2
(45) Date of Patent: Jan. 16, 2018

(54) DISPLAY DRIVING APPARATUS AND METHOD FOR DRIVING TOUCH DISPLAY PANEL

(71) Applicant: Novatek Microelectronics Corp., Hsinchu (TW)

(72) Inventors: Kun-Yueh Lin, Hsinchu (TW); I-Te Liu, Chiayi County (TW); Chien-Yu Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 225 days.

(21) Appl. No.: 14/722,168

(22) Filed: May 27, 2015

(65) Prior Publication Data

US 2016/0349896 A1   Dec. 1, 2016

(51) Int. Cl.
*G06F 3/041* (2006.01)
*G02F 1/1333* (2006.01)

(52) U.S. Cl.
CPC ........ *G06F 3/0416* (2013.01); *G02F 1/13338* (2013.01)

(58) Field of Classification Search
None
See application file for complete search history.

(56) References Cited

U.S. PATENT DOCUMENTS

| | | | |
|---|---|---|---|
| 2010/0067646 A1 | 3/2010 | Liu et al. | |
| 2013/0241814 A1* | 9/2013 | Hirabayashi | G09G 3/3677 345/100 |
| 2014/0049512 A1* | 2/2014 | Yang | G06F 3/0416 345/174 |
| 2015/0035766 A1 | 2/2015 | Chung | |
| 2015/0054781 A1* | 2/2015 | Miyamoto | G06F 3/044 345/174 |
| 2016/0086562 A1 | 3/2016 | Tan et al. | |

FOREIGN PATENT DOCUMENTS

| | | |
|---|---|---|
| CN | 103714792 | 4/2014 |
| CN | 103943083 | 7/2014 |
| TW | 201013695 | 4/2010 |
| TW | 201506894 | 2/2015 |

OTHER PUBLICATIONS

"Office Action of Taiwan Counterpart Application", dated Jun. 15, 2016, p. 1-p. 10, in which the listed reference was cited.

* cited by examiner

*Primary Examiner* — Christopher Kohlman
(74) *Attorney, Agent, or Firm* — JCIPRNET

(57) ABSTRACT

A display driving apparatus configured to drive a touch display panel is provided. The touch display panel includes gate drivers and scan lines. The display driving apparatus includes a driving controller. The driving controller provides clock signals to the gate drivers during a display period. The display period includes scan operation periods. The gate drivers drive the scan lines according to the clock signals during the scan operation periods. The driving controller further provides a clear signal and a pre-charge signal to at least one of the gate drivers to insert at least one touch sensing period between the scan operation periods, so that the touch display panel performs a touch sensing operation during the at least one touch sensing period. Furthermore, a method for driving the touch display panel is also provided.

22 Claims, 12 Drawing Sheets

DISPLAY DRIVING APPARATUS AND METHOD FOR DRIVING TOUCH DISPLAY PANEL

BACKGROUND OF THE INVENTION

1. Field of the Invention

The invention relates to a driving apparatus and a driving method thereof. More particularly, the invention relates to a display driving apparatus and a method for driving a touch display panel.

2. Description of Related Art

With the blooming development in the touch technology, electronic apparatuses such as cell phones, notebook computers, flat panel displays, or tablet computers, etc., display panels thereof are usually combined with touch panels to provide users intuitive input methods and operation interfaces. In the related art, if the touch display panel that has functions of images display and touch sensing would like to perform a touch sensing operation on gestures, the touch sensing operation may be performed during a front porch and a back porch of an image display period. That is to say, if the frame rate of the display panel is 60 Hz, it means that the scanning frequency of the touch panel may be limited to the frame rate. If the scanning frequency of the touch panel is not effectively increased, the touch sensing function of the touch display panel is also obviously affected.

SUMMARY OF THE INVENTION

The invention provides a display driving apparatus configured to drive a touch display panel and capable of increasing a scan frequency of touch signals.

The invention provides a method for driving a touch display panel and capable of increasing a scan frequency of touch signals.

A display driving apparatus of the invention is configured to drive a touch display panel. The touch display panel includes a plurality of gate drivers and a plurality of scan lines. The display driving apparatus includes a driving controller. The driving controller is configured to provide a plurality of clock signals to the gate drivers during a display period. The display period includes a plurality of scan operation periods. The gate drivers drive the scan lines during the scan operation periods according to the clock signals. The driving controller further provides a clear signal and a pre-charge signal to at least one of the gate drivers to insert at least one touch sensing period between the scan operation periods, so that the touch display panel performs a touch sensing operation during the at least one touch sensing period.

In an exemplary embodiment of the invention, the at least one touch sensing period is arranged between two of the scan operation periods.

In an exemplary embodiment of the invention, the at least one touch sensing period includes a plurality of touch sensing periods. The touch sensing periods and the scan operation periods are alternately arranged during the display period.

In an exemplary embodiment of the invention, during the display period, a number of the touch sensing periods is less than a number of the scan operation periods.

In an exemplary embodiment of the invention, during the display period, a time period of the at least one touch sensing period is smaller than a time period of each of the scan operation periods.

In an exemplary embodiment of the invention, on the touch display panel, an output of each of the gate drivers serves as an input of a next gate driver thereof. The gate drivers are grouped into a plurality of gate driving stages. The driving controller transmits the clear signal to a last gate driver of a first gate driving stage of the gate driving stages. The driving controller transmits the pre-charge signal to a first gate driver of a second gate driving stage of the gate driving stages.

In an exemplary embodiment of the invention, the driving controller further transmits the clear signal to the first gate driver of the second gate driving stage of the gate driving stages. The driving controller further transmits the pre-charge signal to the last gate driver of the first gate driving stage of the gate driving stages.

In an exemplary embodiment of the invention, the driving controller further transmits the clear signal to the last gate driver of each of the gate driving stages except for the second gate driving stage. The driving controller further transmits the pre-charge signal to the first gate driver of each of the gate driving stages except for the first gate driving stage.

In an exemplary embodiment of the invention, except for the first gate driving stage, the first gate driver of each of the gate driving stages includes a first pre-charge circuit. The first pre-charge circuit is configured to receive the pre-charge signal and an output of a previous gate driver thereof. The pre-charge signal charges a capacitor of the first pre-charge circuit. The first gate driver generates a scan signal of the first gate driver according to an output of the first pre-charge circuit.

In an exemplary embodiment of the invention, the driving controller further transmits the clear signal to the first gate driver of each of the gate driving stages except for the first gate driving stage. The driving controller further transmits the pre-charge signal to the last gate driver of each of the gate driving stages except for the second gate driving stage.

In an exemplary embodiment of the invention, except for the second gate driving stage, the last gate driver of each of the gate driving stages includes a second pre-charge circuit. The second pre-charge circuit is configured to receive the pre-charge signal and an output of a next gate driver thereof. The pre-charge signal charges a capacitor of the second pre-charge circuit. The last gate driver generates a scan signal of the last gate driver according to an output of the second pre-charge circuit.

In an exemplary embodiment of the invention, the gate drivers are grouped into a plurality of gate driving stages. A number of the gate drivers of each of the gate driving stages is identical or different In an exemplary embodiment of the invention, on the touch display panel, outputs of a part of the gate drivers serve as inputs of previous gate drivers thereof.

In an exemplary embodiment of the invention, the driving controller further provides a scan signal of positive sequence to the gate drivers. The gate drivers scan the scan lines from a first scan line to a last scan line during the scan operation periods according to the scan signal of positive sequence.

In an exemplary embodiment of the invention, the driving controller further provides a scan signal of inverse sequence to the gate drivers. The gate drivers scan the scan lines from a last scan line to a first scan line during the scan operation periods according to the scan signal of inverse sequence.

A method of the invention for driving a touch display panel includes: providing a plurality of clock signals to the gate drivers during a display period to drive the gate drivers to drive the scan lines during the scan operation periods according to the clock signals; and further providing a clear signal and a pre-charge signal to at least one of the gate drivers to drive the touch display panel to perform a touch sensing operation during at least one touch sensing period. The at least one touch sensing period is inserted between the scan operation periods according to the clear signal and the pre-charge signal.

In an exemplary embodiment of the invention, in the step of further providing the clear signal and the pre-charge signal to the at least one of the gate drivers, the clear signal is transmitted to a last gate driver of a first gate driving stage of the gate driving stages, and the pre-charge signal is transmitted to a first gate driver of a second gate driving stage of the gate driving stages.

In an exemplary embodiment of the invention, in the step of further providing the clear signal and the pre-charge signal to the at least one of the gate drivers, the clear signal is further transmitted to a first gate driver of a second gate driving stage of the gate driving stages, and the pre-charge signal is further transmitted to a last gate driver of a first gate driving stage of the gate driving stages.

In an exemplary embodiment of the invention, in the step of further providing the clear signal and the pre-charge signal to the at least one of the gate drivers, the clear signal is transmitted to a last gate driver of each of the gate driving stages except for the second gate driving stage, and the pre-charge signal is transmitted to a first gate driver of each of the gate driving stages except for the first gate driving stage.

In an exemplary embodiment of the invention, in the step of further providing the clear signal and the pre-charge signal to the at least one of the gate drivers, the clear signal is further transmitted to a first gate driver of each of the gate driving stages except for the first gate driving stage, and the pre-charge signal is further transmitted to a last gate driver of each of the gate driving stages except for the second gate driving stage.

In an exemplary embodiment of the invention, the method further includes: further providing a scan signal of positive sequence to the gate drivers to drive the gate drivers to scan the scan lines from a first scan line to a last scan line during the scan operation periods according to the scan signal of positive sequence.

In an exemplary embodiment of the invention, the method further includes: further providing a scan signal of inverse sequence to the gate drivers to drive the gate drivers to scan the scan lines from a last scan line to a first scan line during the scan operation periods according to the scan signal of inverse sequence.

Based on the above, in the exemplary embodiments of the invention, the driving controller provides the clear signal and the pre-charge signal to the gate drivers, so as to insert the touch sensing periods between the scan operation periods. Accordingly, the touch display panel may perform the touch sensing operation at a high scan frequency.

In order to make the aforementioned and other objects, features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
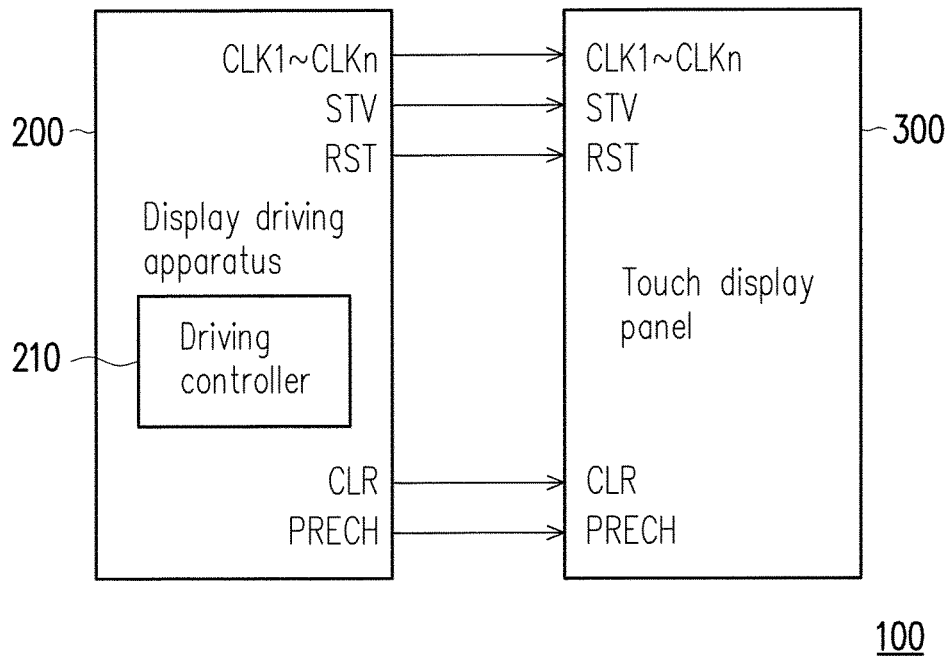
FIG. 1 is a schematic view of a touch display apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
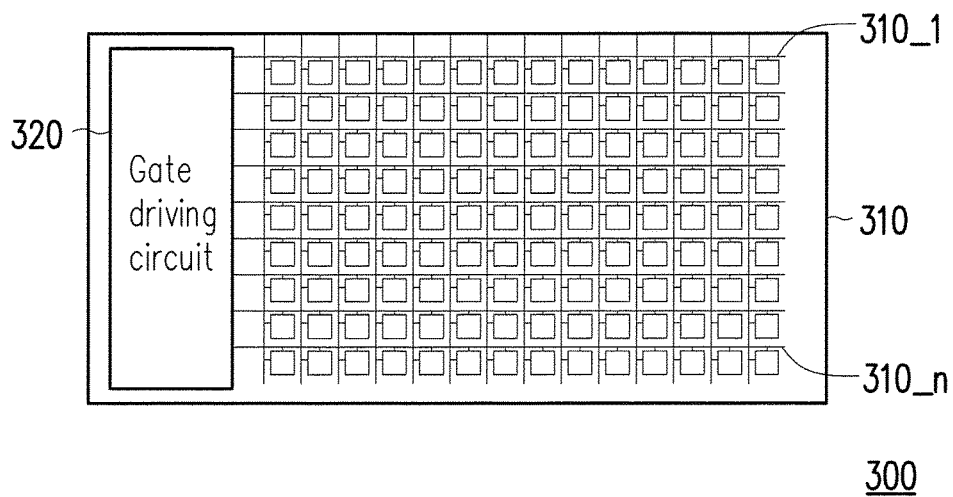
FIG. 2 is a schematic view of a touch display panel according to an embodiment of the invention.

FIG. 1 is a schematic view of a touch display apparatus according to an embodiment of the invention. FIG. 2 is a schematic view of a touch display panel according to an embodiment of the invention. Referring to FIG. 1 and FIG. 2, the touch display apparatus 100 of this embodiment includes a display driving apparatus 200 and a touch display panel 300. The display driving apparatus 200 is configured to drive the touch display panel 300 to display an image frame, or configured to drive the touch display panel 300 to perform a touch sensing operation for gestures. In this embodiment, the display driving apparatus 200 may be disposed at a driver IC side of the touch display apparatus 100, and the touch display panel 300 may be disposed at a panel side of the touch display apparatus 100. The touch display panel 300, for example, may include a display panel 310, and a touch panel (not shown) may be combined with the display panel 310 in the manner of added-on or in/on-cell to form the touch display panel 300. In this embodiment, the display panel 310, for example, includes a gate driving circuit 320 and a plurality of scan lines 310_1 to 310_n. The gate driving circuit 320 combined with the display panel 310 is disposed on the display panel 310. Accordingly, the display panel 310 is, for example, fabricated in technology of gate on array (GOA).

Figure 3:
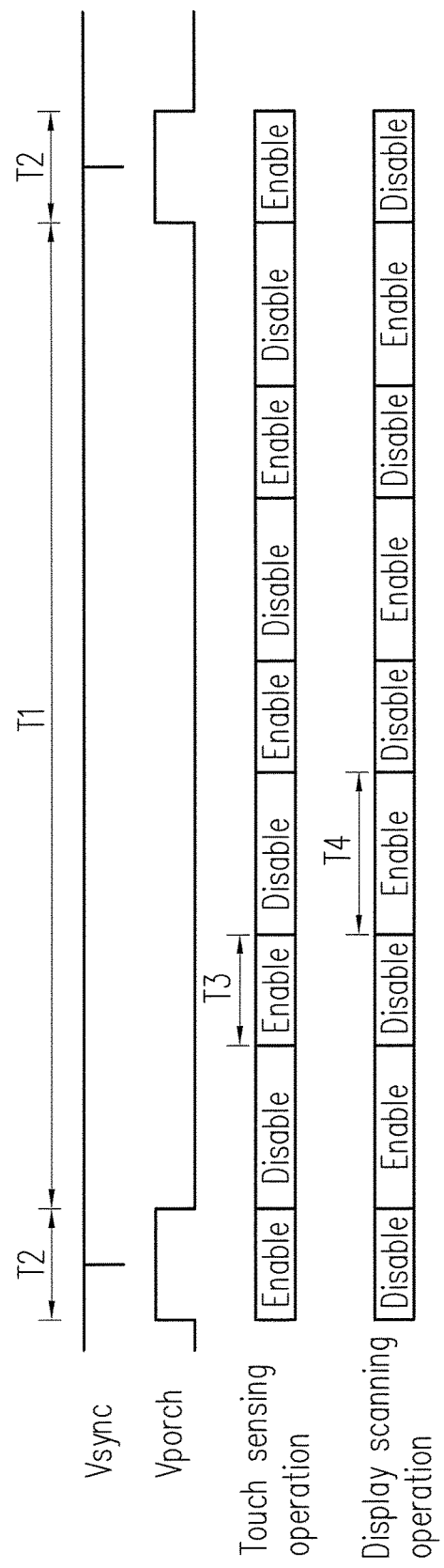
FIG. 3 is a schematic view of electrical signals of the touch display apparatus and operation periods of the touch display panel according to an embodiment of the invention.

FIG. 3 is a schematic view of electrical signals of the touch display apparatus and operation periods of the touch display panel according to an embodiment of the invention. With reference to FIG. 1 and FIG. 3, the display driving apparatus 200 of this embodiment includes a driving controller 210. The driving controller 210 is electrically connected to the touch display panel 300. The driving controller 210 is configured to provide a plurality of clock signals CLK1 to CLKn to the gate driving circuit 320 during a display period, so that the gate drivers therein accordingly output scan signals G1 to Gn to respectively drive the scan lines 310_1 to 310_n, where n is a positive integer larger than 1.

Specifically, in this embodiment, according to whether image frames are display, the operation period of the touch display panel 300 may be mainly divided into display periods T1 and non-display periods T2. During the display period T1, the touch display panel 300 is configured to display image frames. During the non-display period T2, the touch display panel 300 is, for example, configured to perform the touch sensing operation for gestures. In this embodiment, the period between two signal impulses of the vertical synchronous signal Vsync indicates a time interval of displaying an image frame. The high levels of the porch signal are respectively corresponding to a front porch and a buck porch of the time interval, as shown in FIG. 3. In addition, in this embodiment, the display period T1 includes a plurality of scan operation periods T4. The gate driving circuit 320 drives the scan lines 310_1 to 310_n during the scan operation periods T4 according to the clock signals CLK1 to CLKn.

In this embodiment, the driving controller 210 further provides a clear signal CLR and a pre-charge signal PRECH to the gate driving circuit 320, to insert at least one touch sensing period T3 between the scan operation periods T4, so that the touch display panel 300 performs the touch sensing operation during the touch sensing periods T3. In FIG. 3, the touch sensing operation symbolized with "Enable," and the display scanning operation symbolized with "Disable" indicate that the touch display panel 300 performs the touch sensing operation in the meanwhile. By contrast, the touch sensing operation symbolized with "Disable," and the display scanning operation symbolized with "Enable" indicate that the driving controller 210 performs the display scanning operation in the meanwhile. FIG. 3 illustrates an exemplary embodiment that the driving controller 210 inserts a plurality of touch sensing periods T3 between the scan operation periods T4. In this exemplary embodiment, the display period T1 includes the plurality of touch sensing periods T3 and the plurality of scan operation periods T4, and they are alternately arranged during the display period T1. In one embodiment, the display period T1 may also include two scan operation periods T4, and the driving controller 210 may simply insert a single touch sensing period T3 between the two scan operation periods T4. The invention is not limited thereto.

Furthermore, in this embodiment, during the display period T1, the number of the touch sensing periods T3 is less than the number of the scan operation periods T4. The time period of one of the touch sensing period T3 is smaller than that of each of the scan operation periods T4. The numbers and the relationship of time period of the touch sensing periods T3 and the scan operation periods T4 in this embodiment are simply exemplary for description, and the invention is not limited thereto.

Accordingly, in exemplary embodiments of the invention, by providing the clear signal CLR and the pre-charge signal PRECH to the gate driving circuit 320, the touch sensing periods T3 may be added in the display period T1, so that the driving controller 210 may drive the touch display panel 300 to perform the touch sensing operation for gestures at the high scan frequency.

Figure 4:
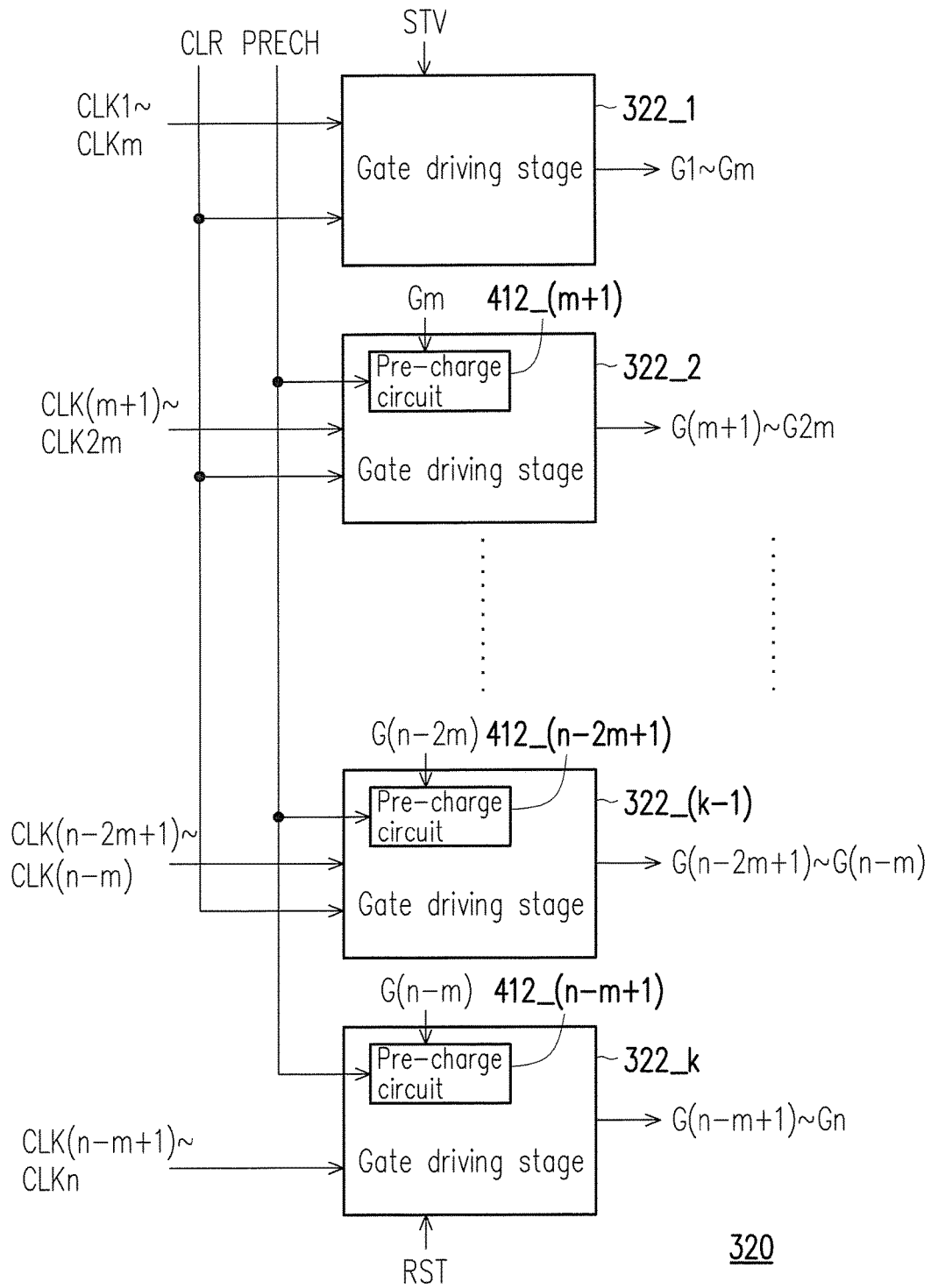
FIG. 4 is a schematic view inside the gate driving circuit according to an embodiment of the invention.
Figure 5:
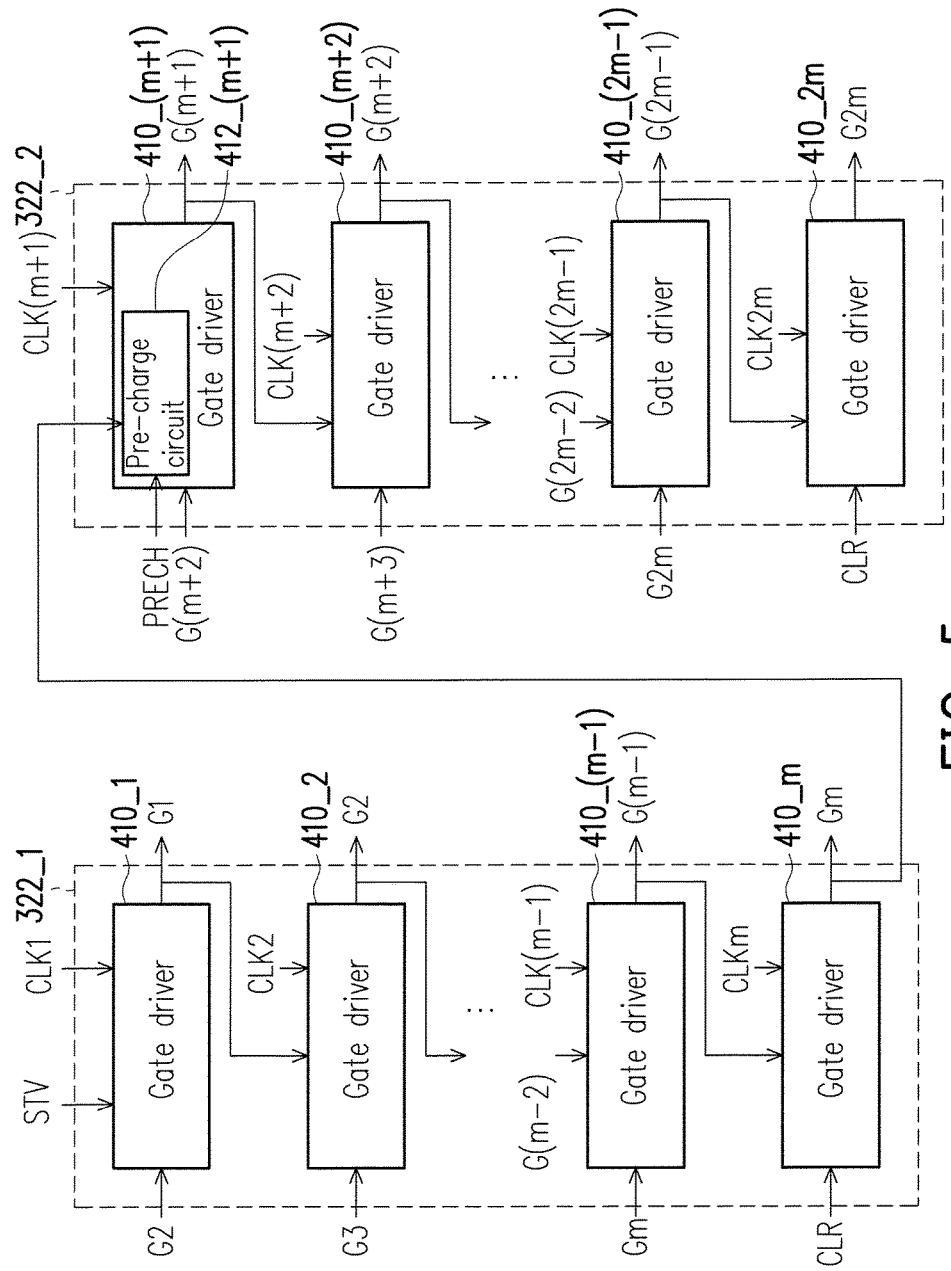
FIG. 5 is a schematic view inside the gate driving stages according to an embodiment of the invention.
Figure 6:
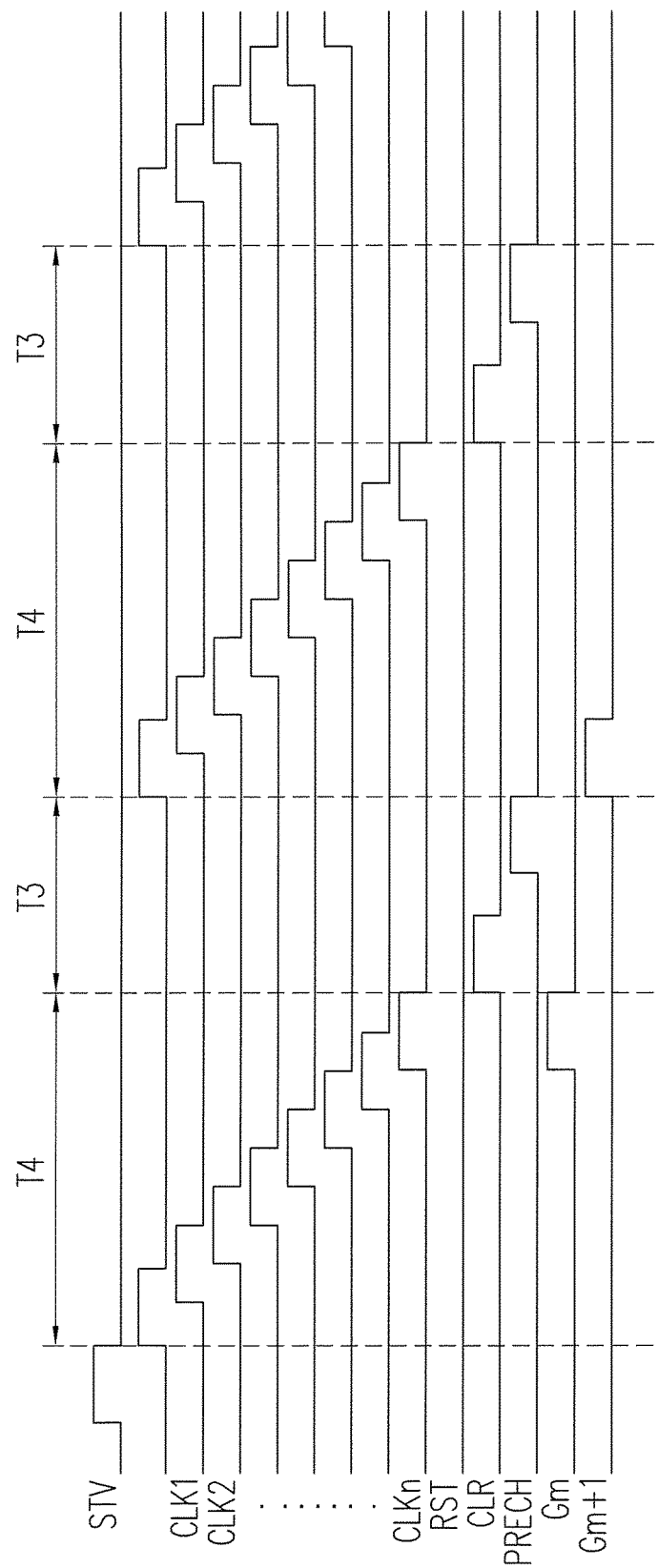
FIG. 6 illustrates schematic waveforms of the driving signals provided by the driving controller according to an embodiment of the invention.

FIG. 4 is a schematic view inside the gate driving circuit according to an embodiment of the invention. FIG. 5 is a schematic view inside the gate driving stages according to an embodiment of the invention. FIG. 6 illustrates schematic waveforms of the driving signals provided by the driving controller according to an embodiment of the invention. Referring to FIG. 4 to FIG. 6, the gate driving circuit 320 of this embodiment includes a plurality of gate driving stages 322_1 to 322_k, and the gate driving stages 322_1 to 322_k respectively include a plurality of gate drivers, where k is an integer larger than 1. For example, in this embodiment, the gate driving stage 322_1 includes gate drivers 410_1 to 410_m, and the gate driving stage 322_2 includes gate drivers 410_(m−1) to 410_2m, where m is an integer larger than 1. For clarity, FIG. 5 simply illustrates the signal transmission of the gate drivers inside the gate driving stages 322_1 and 322_2, and the signal transmission of the gate drivers inside other gate driving stages may be deduced by analogy. Besides, in this embodiment, each gate driving stage including m gate drivers is exemplary for description, but the invention is not limited thereto. In other embodiments, the number of the gate drivers of each of the gate driving stages may be partially identical, partially different, or completely different. In other words, in the exemplary embodiments of the invention, the gate drivers of the gate driving circuit 320 are grouped into the gate driving stages 322_1 to 322_k, and the number of the gate drivers of each gate driving stage may be identical or different.

To be specific, in this embodiment, the gate drivers of the gate driving stages 322_1 to 322_k scan the scan lines 310_1 to 310_n from the first scan line 310_1 to the last scan line 310_n in the manner of positive scanning sequence during the scan operation periods T4 according to the clock signals CLK1 to CLKn. The invention is not limited thereto. In one embodiment, the gate drivers of the gate driving stages 322_1 to 322_k may scan the scan lines 310_1 to 310_n from the last scan line 310_n to the first scan line 310_1 in the manner of inverse scanning sequence during the scan operation periods T4.

In this embodiment, taking the gate driving stage 322_1 as an example, the output of each of the gate drivers 410_1 to 410_m serves as the input of the next gate driver thereof. For example, the scan signal G1 outputted by the gate driver 410_1 serves as the input signal of the gate driver 410_2. The scan signal Gm outputted by the gate driver 410_m serves as the input signal of the gate driver 410_(m+1). The signal transmissions of other gate drivers may be deduced by analogy, and it is not described again herein. In addition, in this embodiment, outputs of a part of the gate drivers serve as inputs of previous gate drivers thereof. Taking the gate driving stage 322_1 as an example, the scan signal G2 outputted by the gate driver 410_2 serves as the input signals of the gate driver 410_1. However, the scan signal G(m+1) outputted by the gate driver 410_(m+1) of the gate driving stage 322_2 is not transmitted to the gate driver 410_m to serve as the input signal thereof. It should be noted that whether the output of each gate driver serves as the input of the next gate driver or the previous gate driver is determined according to design requirements, and the invention is not limited thereto.

In this embodiment, the driving controller 210, for example, transmits the clear signal CLR to the last gate driver of each of the gate driving stages 322_1 to 322_(k−1). The driving controller 210, for example, transmits the pre-charge signal PRECH to the first gate driver of each of the gate driving stages 322_2 to 322_k. For example, the driving controller 210 may transmit the pre-charge signal PRECH to the first gate driver 410_(m+1) of the gate driving stage 322_2. The driving controller 210, for example, transmits the clear signal CLR to the last gate driver 410_2m of the gate driving stage 322_2. The signal transmissions of other gate drivers may be deduced by analogy, and it is not described again herein.

It should be not noted that the gate drivers of the gate driving circuit 320 are grouped into at least two gate driving stages 322_1 to 322_k. Accordingly, the driving controller 210 does not transmit the clear signal CLR to the last gate driver (not shown) of the gate driving stage 322_k. The driving controller 210 does not transmit the pre-charge signal PRECH to the first gate driver 410_1 of the gate driving stage 322_1.

In one embodiment that the gate drivers of the gate driving circuit are simply grouped into two gate driving stages, e.g., the gate driving stages 322_1 to 322_2, the driving controller 210 transmits the clear signal CLR to the last gate driver 410_m of the gate driving stage 322_1, i.e., the first gate driving stage. The driving controller 210 transmits the pre-charge signal PRECH to the first gate driver 410_(m+1) of the gate driving stage 322_2, i.e., the second gate driving stage.

Furthermore, in this embodiment, among the gate driving stages 322_2 to 322_k, the gate drivers configured to receive the pre-charge signal PRECH respectively include pre-charge circuits 412_(m+1) to 412_(n−m+1), for example. For example, in the gate driving stage 322_2, the gate driver 410 (m+1) includes the pre-charge circuits 412_(m+1) configured to receive the pre-charge signal PRECH.

Figure 7:
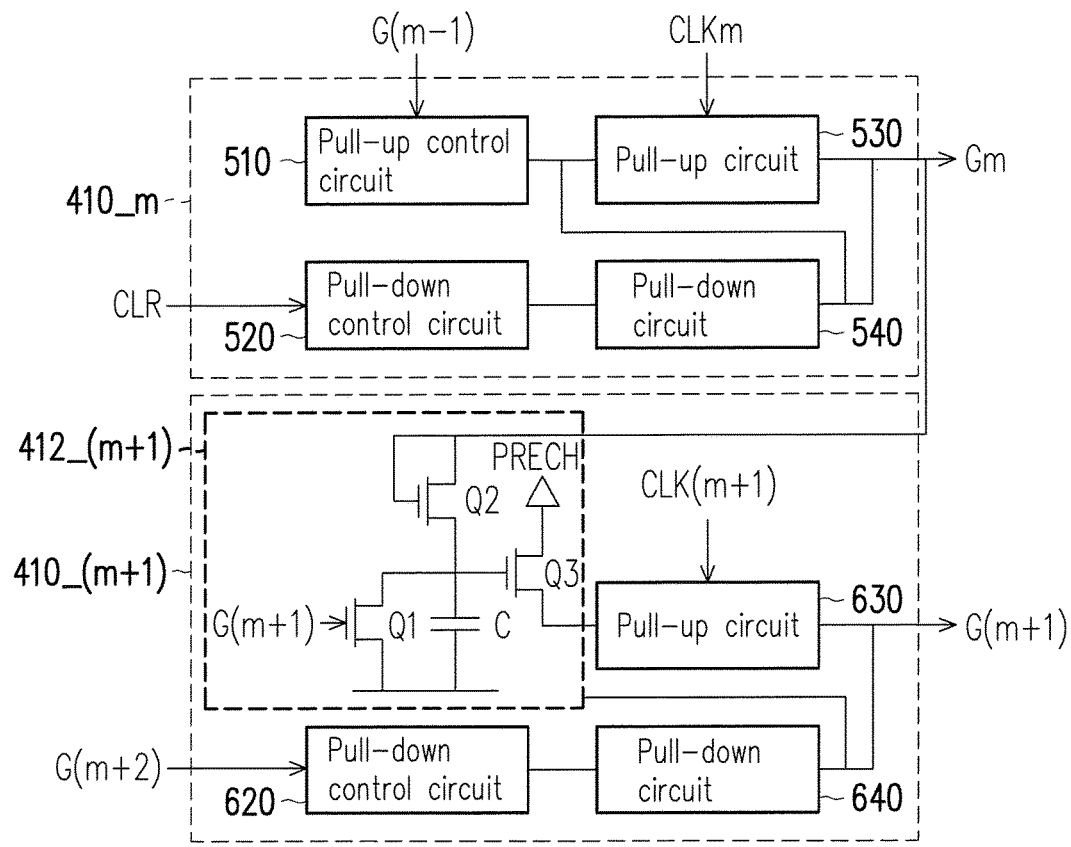
FIG. 7 is a schematic view inside the gate driver according to an embodiment of the invention.

FIG. 7 is a schematic view inside the gate driver according to an embodiment of the invention. In this embodiment, the gate drivers 410_1 and 410_(m+1) may be equivalent to shift registers, for example. In this embodiment, the gate driver 410_m includes a pull-up control circuit 510, a pull-down control circuit 520, a pull-up circuit 530, and a pull-down circuit 540. The gate driver 410_(m+1) includes the pre-charge circuit 412_(m+1), a pull-down control circuit 620, a pull-up circuit 630, and a pull-down circuit 640.

Specifically, in this embodiment, based on the gate signal G(m−1), the pull-up control circuit 510 is configured to control the pull-up circuit 530 to pull up the voltage of the gate signal Gm to a high level according to the clock signal CLKm. Next, the clear signal CLR is configured to clear register data of the pull-down control circuit 520, so as to allow the pull-down control circuit 520 to control the pull-down circuit 540 to pull down the voltage of the gate signal Gm to a low level. Accordingly, the gate driver 410_m may output the gate signal Gm to drive the scan line connected thereto. After the gate signal Gm is outputted, the operation sequence of the touch display panel 300 enters the touch sensing period T3 from the scan operation period T4 to perform the touch sensing operation.

Next, when the touch sensing period T3 is to be finished, the pre-charge circuit 412_(m+1) charges a capacitor C of the pre-charge circuit 412_(m+1) by using the gate signals Gm and G(m+1) and the pre-charge signal PRECH. Accordingly, after the touch sensing period T3 is finished, the pull-up circuit 630 pulls up the voltage of the gate signal G(m+1) to a high level according to the clock signal CLK(m+1). Next, the pull-down control circuit 620 controls the pull-down circuit 640 to pull down the voltage of the gate signal G(m+1) to a low level according to the gate signal G(m+2). Accordingly, the gate driver 410_(m+1) may output the gate signal G(m+1) to drive the scan line connected thereto. Thereafter, the gate driver 410_(m+2) then performs the display scanning operation on the scan line connected thereto The operations of other gate drivers may be deduced by analogy, and it is not described again herein.

It should be noted that the gate signal G(m+1) may be transmitted to the pre-charge circuit 412_(m+1) according to the design of the pre-charge circuit 412 (m+1) in this embodiment, but the invention is not limited thereto. Besides, in this embodiment, the circuit structure of the pre-charge circuit 412 (m+1) is exemplary for description, but the invention is not limited thereto.

Figure 8:
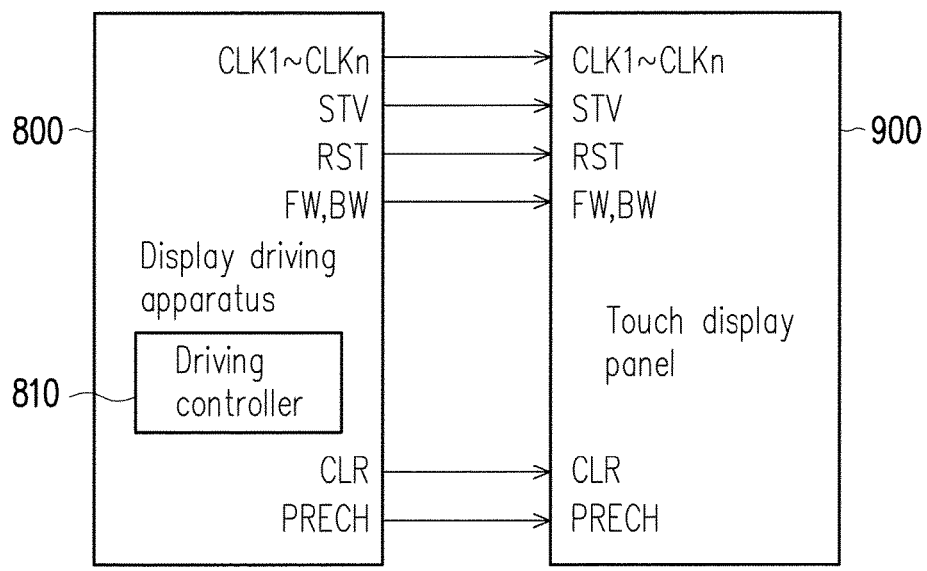
FIG. 8 is a schematic view of a touch display apparatus according to another embodiment of the invention.

FIG. 8 is a schematic view of a touch display apparatus according to another embodiment of the invention. Referring to FIG. 1 and FIG. 8, the touch display apparatus 700 of this embodiment is similar to the touch display apparatus 100 of FIG. 1. The main difference between the two lies in that the driving controller 810 further provides a scan signal FW of positive sequence and a scan signal BW of inverse sequence to the gate drivers of the touch display panel 900.

Figure 9:
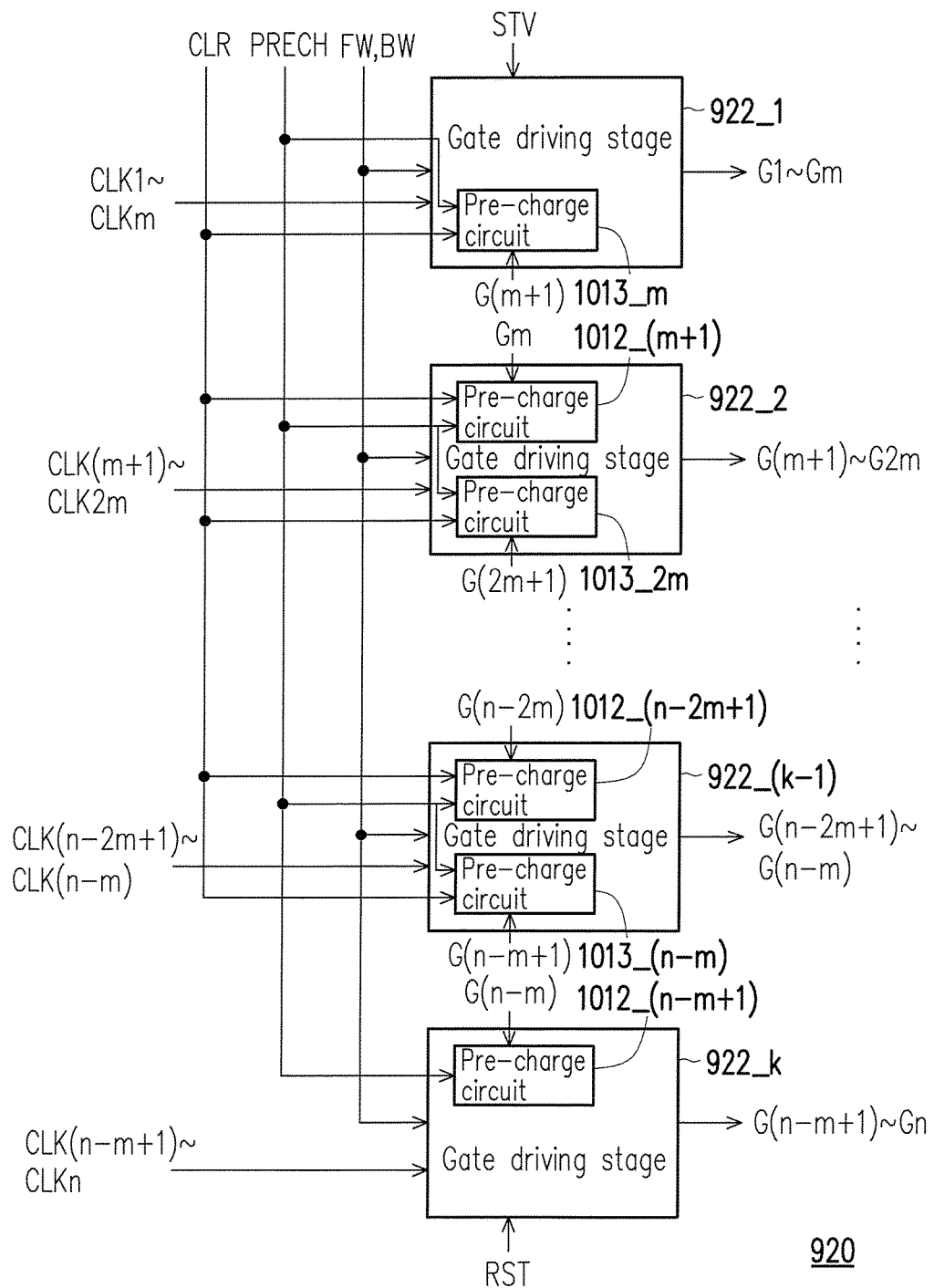
FIG. 9 is a schematic view inside the gate driving circuit according to an embodiment of the invention.
Figure 10:
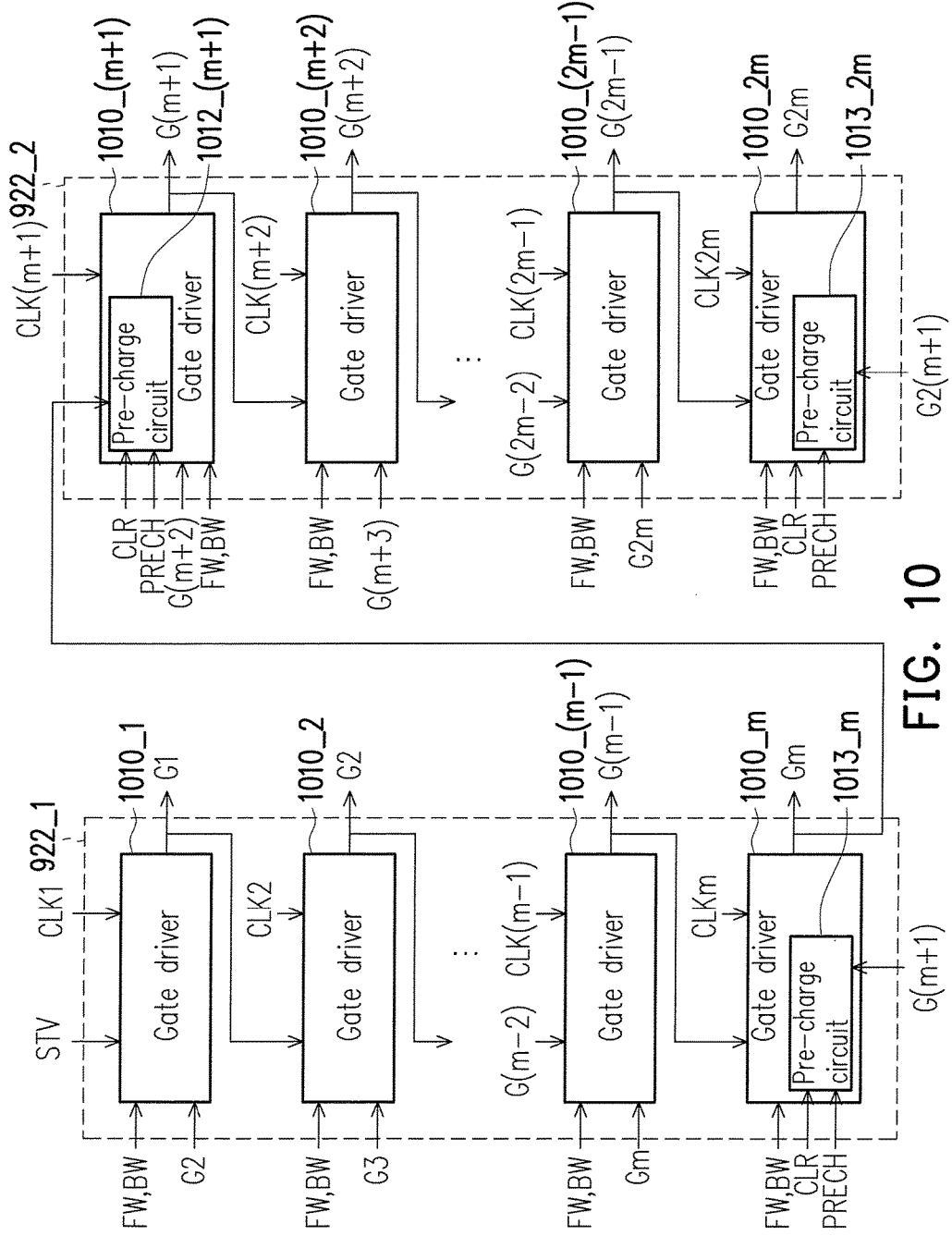
FIG. 10 is a schematic view inside the gate driving stages according to another embodiment of the invention.
Figure 11:
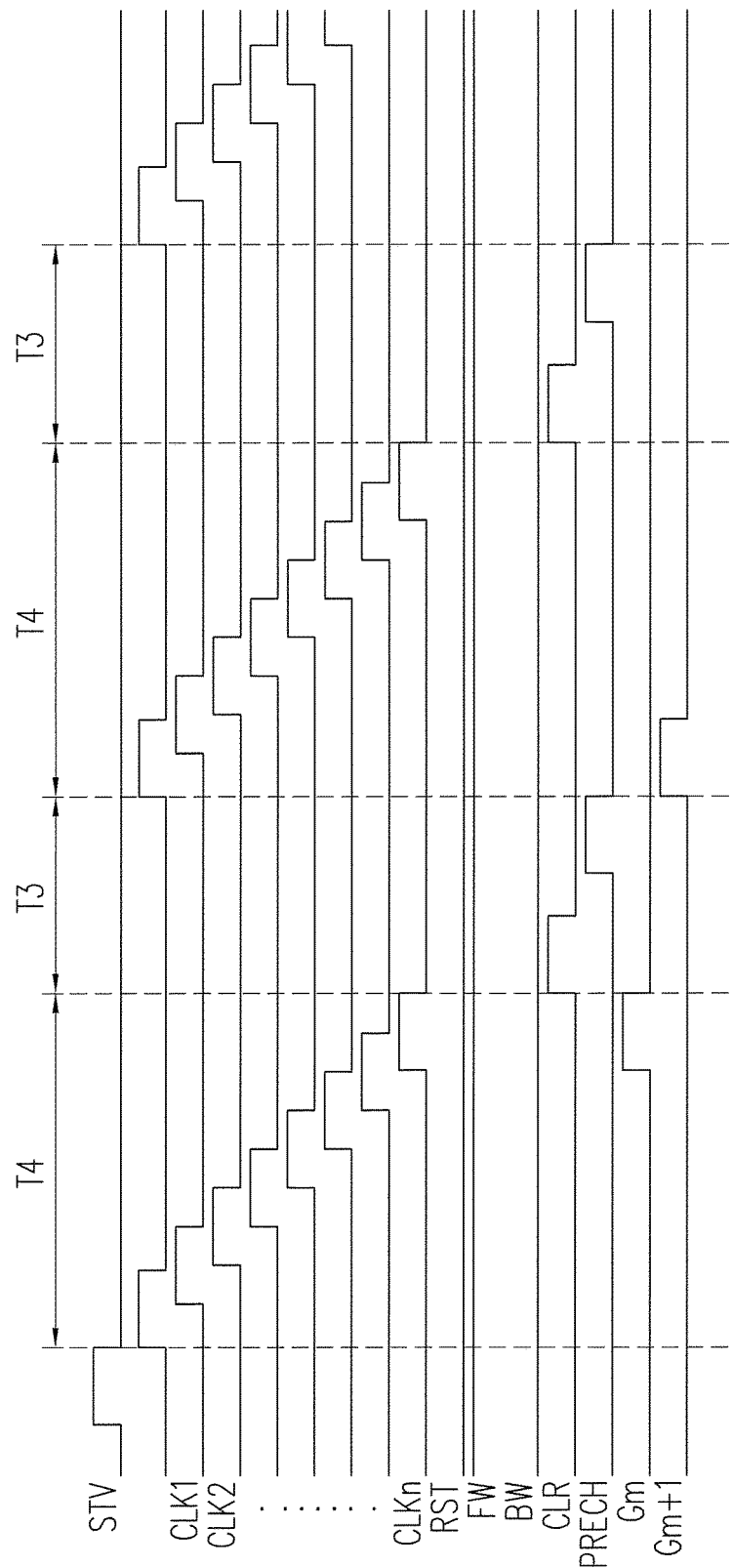
FIG. 11 and FIG. 12 respectively illustrate schematic waveforms of the driving signals provided by the driving controller according to another embodiment of the invention.
Figure 12:
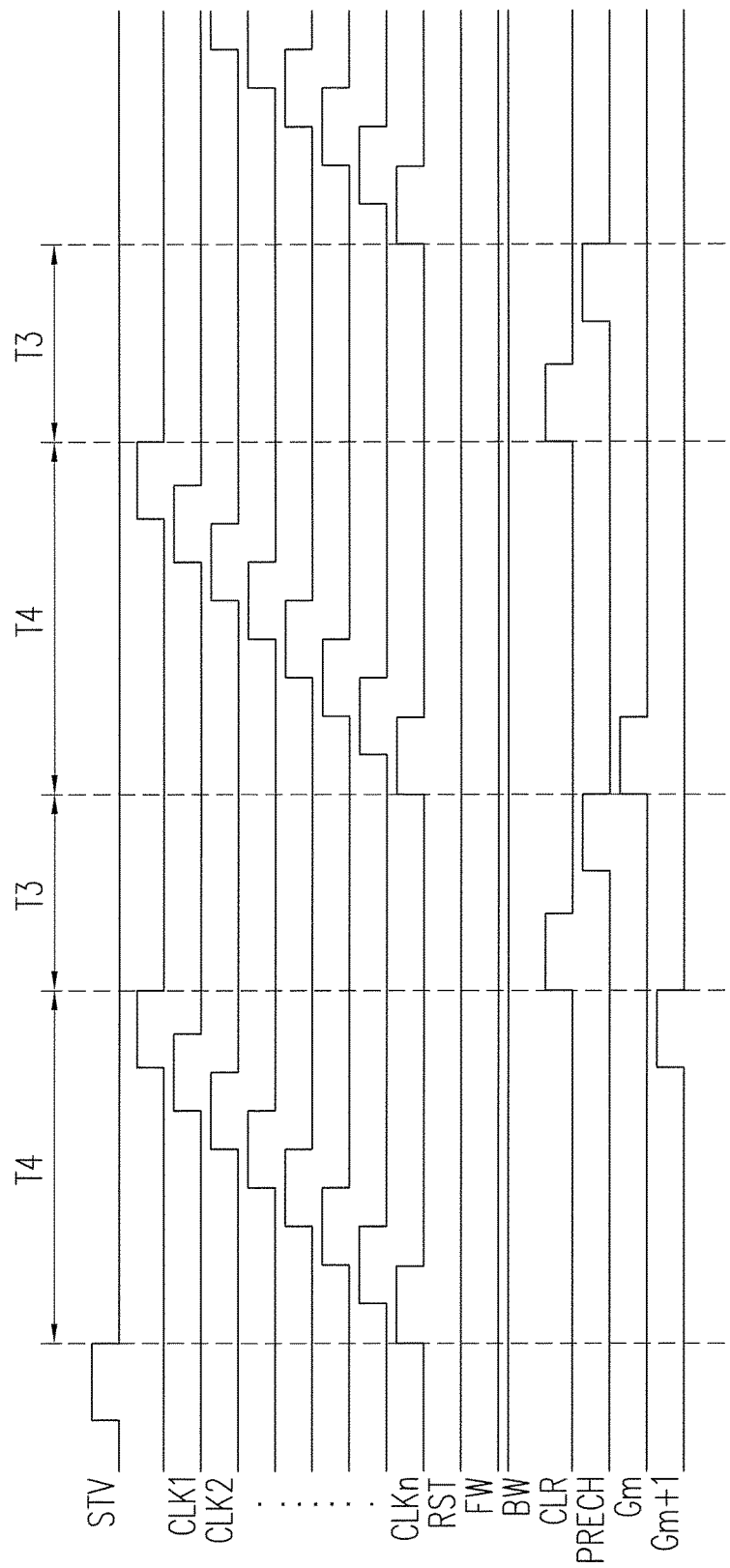

To be specific, FIG. 9 is a schematic view inside the gate driving circuit according to another embodiment of the invention. FIG. 10 is a schematic view inside the gate driving stages according to another embodiment of the invention. FIG. 11 and FIG. 12 respectively illustrate schematic waveforms of the driving signals provided by the driving controller according to another embodiment of the invention. Referring to FIG. 8 to FIG. 12, in this embodiment, the driving controller 810 transmits the scan signal FW of positive sequence and the scan signal BW of inverse sequence to the gate driving stages 922_1 to 922_k. Accordingly, during the scan operation periods T4 of the display period T1 in FIG. 11, the gate drivers of the gate driving stages 922_1 to 922_k scan the scan lines 310_1 to 310_n from the first scan line 310_1 to the last scan line 310_n in the manner of positive scanning sequence according to the clock signals CLK1 to CLKn. Next, during the scan operation periods T4 of the display period T1 in FIG. 12, the gate drivers of the gate driving stages 922_1 to 922_k scan the scan lines 310_1 to 310_n from the last scan line 310_n to the first scan line 310_1 in the manner of inverse scanning sequence according to the clock signals CLK1 to CLKn. Accordingly, the gate drivers of the gate driving stages 922_1 to 922_k may sequentially scan the scan lines 310_1 to 310_n, and then inversely scan the scan lines 310_1 to 310_n, and vice versa. The invention is not limited thereto.

In the embodiment of FIG. 10, corresponding to the design of positive scanning and inverse scanning, the last gate driver of each of the gate driving stages 922_1 to 922_k may further include a pre-charge circuit. For example, the last gate driver 1010_m of the gate driving stage 922_1 includes a pre-charge circuit 1013_m, and the last gate driver 1010_2m of the gate driving stage 922_2 includes a pre-charge circuit 1013_2m.

Figure 13:
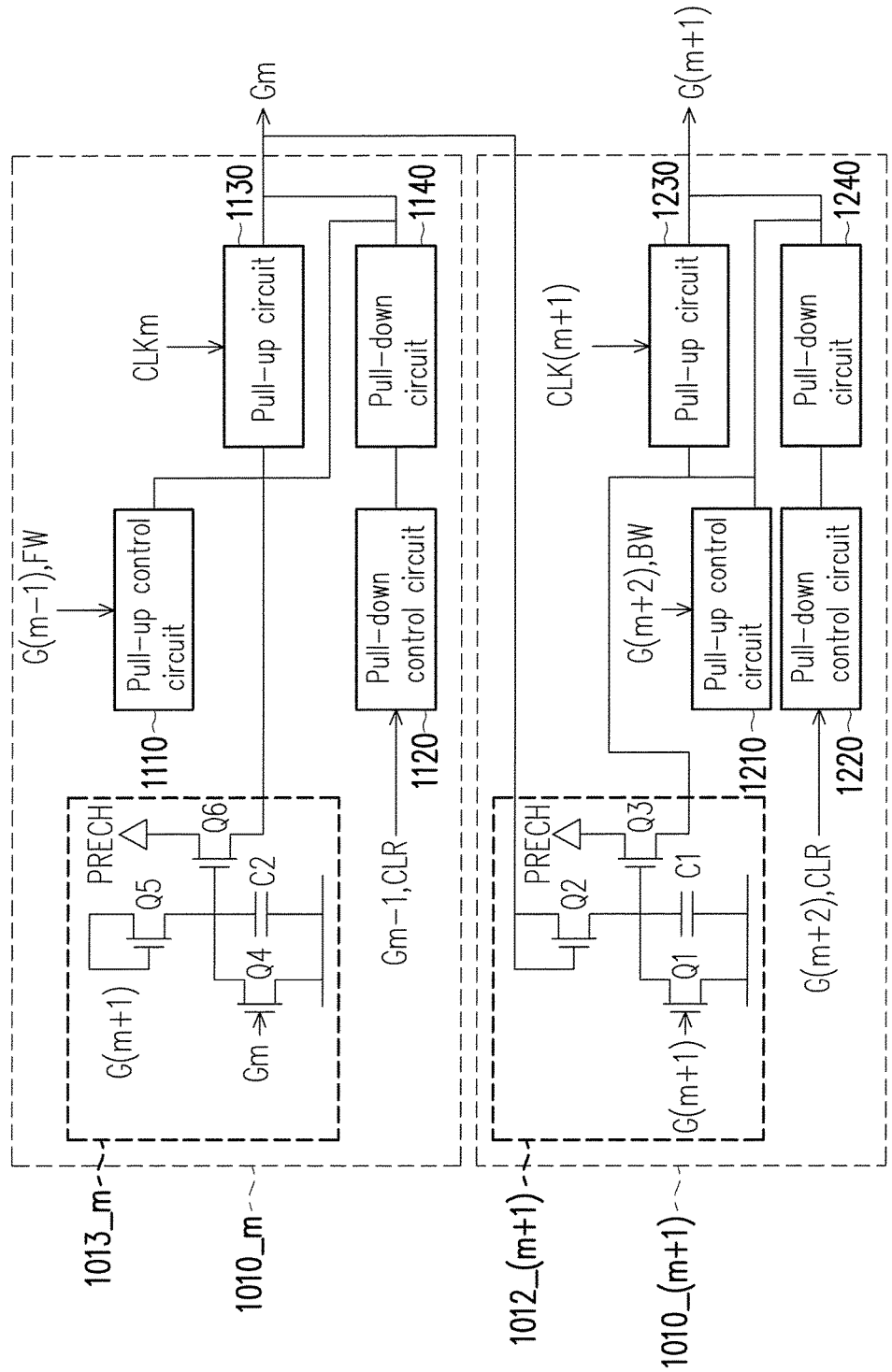
FIG. 13 is a schematic view inside the gate driver according to another embodiment of the invention.

FIG. 13 is a schematic view inside the gate driver according to another embodiment of the invention. In this embodiment, the gate drivers 1010_1 and 1010 (m+1) may be equivalent to shift registers, for example. In this embodiment, the gate driver 1010_m includes the pre-charge circuit 1013_m, a pull-up control circuit 1110, a pull-down control circuit 1120, a pull-up circuit 1130, and a pull-down circuit 1140. The gate driver 1010_(m+1) includes the pre-charge circuit 1012_(m+1), a pull-up control circuit 1210, a pull-down control circuit 1220, a pull-up circuit 1230, and a pull-down circuit 1240.

Specifically, when the positive scanning is performed, the pull-up control circuit 1110 is enabled, and the pull-up control circuit 1210 is disabled. In this case, when the touch sensing period T3 of the positive scanning is to be finished, the pre-charge circuit 1012_(m+1) charges a capacitor C1 by using the gate signals Gm and G(m+1) and the pre-charge signal PRECH. Accordingly, after the touch sensing period T3 of the positive scanning is finished, the pull-up circuit 1230 pulls up the voltage of the gate signal G(m+1) to a high level according to the clock signal CLK(m+1), so as to output the gate signal G(m+1) to drive the scan line connected thereto.

By contrast, when the inverse scanning is performed, the pull-up control circuit 1510 is enabled, and the pull-up control circuit 1410 is disabled. In this case, when the touch sensing period T3 of the inverse scanning is to be finished, the pre-charge circuit 1013_m charges a capacitor C2 by using the gate signals Gm and G(m+1) and the pre-charge signal PRECH. Accordingly, after the touch sensing period T3 of the inverse scanning is finished, the pull-up circuit 1130 pulls up the voltage of the gate signal Gm to a high level according to the clock signal CLKm, so as to output the gate signal Gm to drive the scan line connected thereto.

Besides, the method for driving the scan lines by the gate drivers described in this embodiment of the invention is sufficiently taught, suggested, and embodied in the embodiments illustrated in FIG. 7, and therefore no further description is provided herein.

Figure 14:
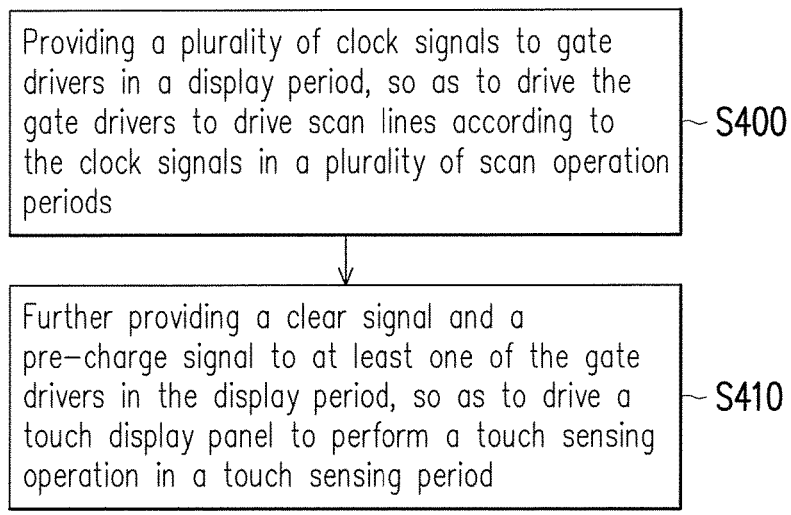
FIG. 14 is a flow chart of a method for driving a touch display panel according to an embodiment of the invention.

FIG. 14 is a flow chart of a method for driving a touch display panel according to an embodiment of the invention. Referring to FIG. 1 and FIG. 14, the method for driving the touch display panel of this embodiment may be, for example, performed by the driving controller 210 of FIG. 1, and configured to drive the touch display panel 300. The invention is not limited thereto. Specifically, in this embodiment, in step S400, during a display period T1, the driving controller 210 provides a plurality of clock signals CLK1 to CLKn to the gate drivers in the gate driving circuit 320, to drive the gate drivers to drive the scan lines 310_1 to 310_n during the scan operation periods T4 according to the clock signals CLK1 to CLKn. Next, in step S410, during the display period T1, the driving controller 210 further provides a clear signal CLR and a pre-charge signal PRECH to the gate drivers in the gate driving circuit 320, to drive the touch display panel 300 to perform the touch sensing operation during the touch sensing periods T3. It should be noted that, in this embodiment although two steps are depicted for describing the method for driving the touch display panel, the invention is not limited thereto. In other embodiments, steps S400 and S410 may be combined and performed in one step. The sequence of steps S400 and S410 does not limited the invention.

Besides, the method for driving the touch display panel described in this embodiment of the invention is sufficiently taught, suggested, and embodied in the embodiments illustrated in FIG. 1 to FIG. 13, and therefore no further description is provided herein.

In summary, in the exemplary embodiments of the invention, the driving controller provides the clear signal and the pre-charge signal to the gate drivers, so as to insert the touch sensing periods between the scan operation periods. The clear signal clears a voltage level of the previous gate driver when the scan operation period is to be finished. The pre-charge signal pre-charges the current gate driver when the touch sensing period is to be finished, and then the current gate driver performs the display scanning operation on the scan lines connected thereto after the touch sensing period is finished. Accordingly, the touch display panel may perform the touch sensing operation at the high scan frequency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display driving apparatus configured to drive a touch display panel, wherein the touch display panel comprises a plurality of gate drivers and a plurality of scan lines, the display driving apparatus comprising:
    a driving controller configured to provide a plurality of clock signals to the gate drivers during a display period, wherein the display period comprises a plurality of scan operation periods, and the gate drivers drive the scan lines during the scan operation periods according to the clock signals,
    wherein the driving controller further provides a clear signal and a pre-charge signal to at least one of the gate drivers to insert at least one touch sensing period between the scan operation periods, so that the touch display panel performs a touch sensing operation during the at least one touch sensing period,
    wherein the clear signal comprises a first pulse, the pre-charge signal comprises a second pulse, and the at least one touch sensing period starts at a rising edge of the first pulse and finishes at a falling edge of the second pulse,
    wherein on the touch display panel, an output of each of the gate drivers serves as an input of a next gate driver thereof, and the gate drivers are grouped into a plurality of gate driving stages,
    wherein the driving controller transmits the clear signal to a last gate driver of a first gate driving stage of the gate driving stages, and the driving controller transmits the pre-charge signal to a first gate driver of a second gate driving stage of the gate driving stages,
    wherein the driving controller further transmits the clear signal to the first gate driver of the second gate driving stage of the gate driving stages, and the driving controller further transmits the pre-charge signal to the last gate driver of the first gate driving stage of the gate driving stages.

2. The display driving apparatus as claimed in claim 1, wherein the at least one touch sensing period is arranged between two of the scan operation periods.

3. The display driving apparatus as claimed in claim 1, wherein the at least one touch sensing period comprises a plurality of touch sensing periods, and the touch sensing periods and the scan operation periods are alternately arranged during the display period.

4. The display driving apparatus as claimed in claim 3, wherein during the display period, a number of the touch sensing periods is less than a number of the scan operation periods.

5. The display driving apparatus as claimed in claim 1, wherein during the display period, a time period of the at least one touch sensing period is smaller than a time period of each of the scan operation periods.

6. The display driving apparatus as claimed in claim 1, wherein the driving controller further transmits the clear signal to the last gate driver of each of the gate driving stages except for the second gate driving stage, and the driving controller further transmits the pre-charge signal to the first gate driver of each of the gate driving stages except for the first gate driving stage.

7. The display driving apparatus as claimed in claim 6, wherein except for the first gate driving stage, the first gate driver of each of the gate driving stages comprises:
   a first pre-charge circuit, configured to receive the pre-charge signal and an output of a previous gate driver thereof, wherein the pre-charge signal charges a capacitor of the first pre-charge circuit, and the first gate driver generates a scan signal of the first gate driver according to an output of the first pre-charge circuit.

8. The display driving apparatus as claimed in claim 6, wherein the driving controller further transmits the clear signal to the first gate driver of each of the gate driving stages except for the first gate driving stage, and the driving controller further transmits the pre-charge signal to the last gate driver of each of the gate driving stages except for the second gate driving stage.

9. The display driving apparatus as claimed in claim 8, wherein except for the second gate driving stage, the last gate driver of each of the gate driving stages comprises:
   a second pre-charge circuit, configured to receive the pre-charge signal and an output of a next gate driver thereof, wherein the pre-charge signal charges a capacitor of the second pre-charge circuit, and the last gate driver generates a scan signal of the last gate driver according to an output of the second pre-charge circuit.

10. The display driving apparatus as claimed in claim 1, wherein the gate drivers are grouped into a plurality of gate driving stages, and a number of the gate drivers of each of the gate driving stages is identical or different.

11. The display driving apparatus as claimed in claim 1, wherein on the touch display panel, outputs of a part of the gate drivers serve as inputs of previous gate drivers thereof.

12. The display driving apparatus as claimed in claim 1, wherein the driving controller further provides a scan signal of positive sequence to the gate drivers, and the gate drivers scan the scan lines from a first scan line to a last scan line during the scan operation periods according to the scan signal of positive sequence.

13. The display driving apparatus as claimed in claim 1, wherein the driving controller further provides a scan signal of inverse sequence to the gate drivers, and the gate drivers scan the scan lines from a last scan line to a first scan line during the scan operation periods according to the scan signal of inverse sequence.

14. A method for driving a touch display panel, wherein the touch display panel comprises a plurality of gate drivers and a plurality of scan lines, the method comprising:
   providing a plurality of clock signals to the gate drivers during a display period to drive the gate drivers to drive the scan lines during the scan operation periods according to the clock signals, wherein the display period comprises the scan operation periods; and
   further providing a clear signal and a pre-charge signal to at least one of the gate drivers to drive the touch display panel to perform a touch sensing operation during at least one touch sensing period,
   wherein the at least one touch sensing period is inserted between the scan operation periods according to the clear signal and the pre-charge signal,
   wherein the clear signal comprises a first pulse, the pre-charge signal comprises a second pulse, and the at least one touch sensing period starts at a rising edge of the first pulse and finishes at a falling edge of the second pulse,
   wherein on the touch display panel, an output of each of the gate drivers serves as an input of a next gate driver thereof, and the gate drivers are grouped into a plurality of gate driving stages,
   in the step of further providing the clear signal and the pre-charge signal to the at least one of the gate drivers, the clear signal is transmitted to a last gate driver of a first gate driving stage of the gate driving stages, and the pre-charge signal is transmitted to a first gate driver of a second gate driving stage of the gate driving stages,
   wherein in the step of further providing the clear signal and the pre-charge signal to the at least one of the gate drivers, the clear signal is further transmitted to a first gate driver of a second gate driving stage of the gate driving stages, and the pre-charge signal is further transmitted to a last gate driver of a first gate driving stage of the gate driving stages.

15. The method as claimed in claim 14, wherein the at least one touch sensing period is arranged between two of the scan operation periods.

16. The method as claimed in claim 14, wherein the at least one touch sensing period comprises a plurality of touch sensing periods, and the touch sensing periods and the scan operation periods are alternately arranged during the display period.

17. The method as claimed in claim 16, wherein during the display period, a number of the touch sensing periods is less than a number of the scan operation periods.

18. The method as claimed in claim 14, wherein during the display period, a time period of the at least one touch sensing period is smaller than a time period of each of the scan operation periods.

19. The method as claimed in claim 14, wherein in the step of further providing the clear signal and the pre-charge signal to the at least one of the gate drivers, the clear signal is transmitted to a last gate driver of each of the gate driving stages except for the second gate driving stage, and the pre-charge signal is transmitted to a first gate driver of each of the gate driving stages except for the first gate driving stage.

20. The method as claimed in claim 19, wherein in the step of further providing the clear signal and the pre-charge signal to the at least one of the gate drivers, the clear signal is further transmitted to a first gate driver of each of the gate driving stages except for the first gate driving stage, and the pre-charge signal is further transmitted to a last gate driver of each of the gate driving stages except for the second gate driving stage.

21. The method as claimed in claim 14, further comprising:
   further providing a scan signal of positive sequence to the gate drivers to drive the gate drivers to scan the scan lines from a first scan line to a last scan line during the scan operation periods according to the scan signal of positive sequence.

22. The method as claimed in claim 14, further comprising:
   further providing a scan signal of inverse sequence to the gate drivers to drive the gate drivers to scan the scan lines from a last scan line to a first scan line during the scan operation periods according to the scan signal of inverse sequence.

* * * * *